United States Patent [19]

Husak

[11] Patent Number: 5,023,517

[45] Date of Patent: Jun. 11, 1991

[54] LIGHT CONTROLLER APPARATUS

[76] Inventor: Ladislav Husak, 8100 Park Plz., #248, Stanton, Calif. 90680

[21] Appl. No.: 351,713

[22] Filed: May 15, 1989

[51] Int. Cl.[5] ............................................. H05B 37/00
[52] U.S. Cl. ................................. 315/200 A; 315/201; 315/312; 315/325
[58] Field of Search ................... 315/200 A, 201, 312, 315/324, 325, 341

[56] References Cited

PUBLICATIONS

M. Hadley, Sound to Light Converter, Practical Electronics, Jun. 1977, vol. 13, No. 6, pp. 418-421.

Primary Examiner—Robert J. Pascal
Attorney, Agent, or Firm—G. Donald Weber, Jr.

[57] ABSTRACT

A light driver circuit which is activated by an audio signal. The circuit includes three signal channels and four automatic level control circuits. The three channels are high, low and mid-range frequency channels. There is an automatic level control circuit circuit at the input of the circuit and a separate automatic level control circuit incorporated into each of the three channels. An optical isolation unit is provided in each channel to, effectively, isolate the output from the signal source. A typical utilization of the circuit is with strobe-lights, discotheque lights, or the like.

17 Claims, 2 Drawing Sheets

LIGHT CONTROLLER APPARATUS

BACKGROUND

1. Field of the Invention

This invention is directed to a signal control apparatus, in general, and to an apparatus for producing output signals which control the operation of load devices such as light sources, in particular.

2. Prior Art

There are many circuits which are known in the art which are utilized to control output signals based upon the input signals supplied thereto. More particularly, many units are known in the art which use the output signals to control or drive appropriate output or load devices. A typical application of this type of unit is to provide a drive circuit which selectively activates an output load such as a light bulb or a light source as a direct function of the type of signal which is supplied to the apparatus.

In the past this type of apparatus has been used as a control unit to produce a "strobe-effect" with lighting devices or the like. A typical application is in discotheques, dance halls, ballrooms and the like. In the past, these systems have usually been limited to one, two or three channels. In some cases, a level controller was used with one or more of the channels. However, a fourth control network was either not available or created substantial difficulties in the operation of the circuit.

Frequently, with the prior devices it was necessary to set up each channel thereof for each kind of music. Moreover, in many of the older style devices, it was necessary to recalibrate the device when the volume of the input signal was changed.

Also, in the prior art devices it was typical to have the output load take the form of light bulbs which required a relatively high voltage. This high voltage was, of course, an ever present danger to the users of the system.

Thus, it is highly desirable to have a system with improved level controls which avoids the problems and shortcomings noted above.

SUMMARY OF THE INVENTION

This invention is directed to a control system which includes three channels and four automatic level control drivers. The three channels operate on high, low and mid-frequency range signals. Each of the channels includes an automatic level controller incorporated therein. A fourth automatic level controller is adapted to interface with the input of the system so as to provide an automatic level controller for the overall system and apparatus.

In addition, each of the channels includes an opto-isolation unit which isolates the load from the input signal source so that there is no cross connection between the signals or the channels. A suitable power supply is provided with the apparatus as well.

DESCRIPTION OF THE PREFERRED EMBODIMENT

Figure 1:
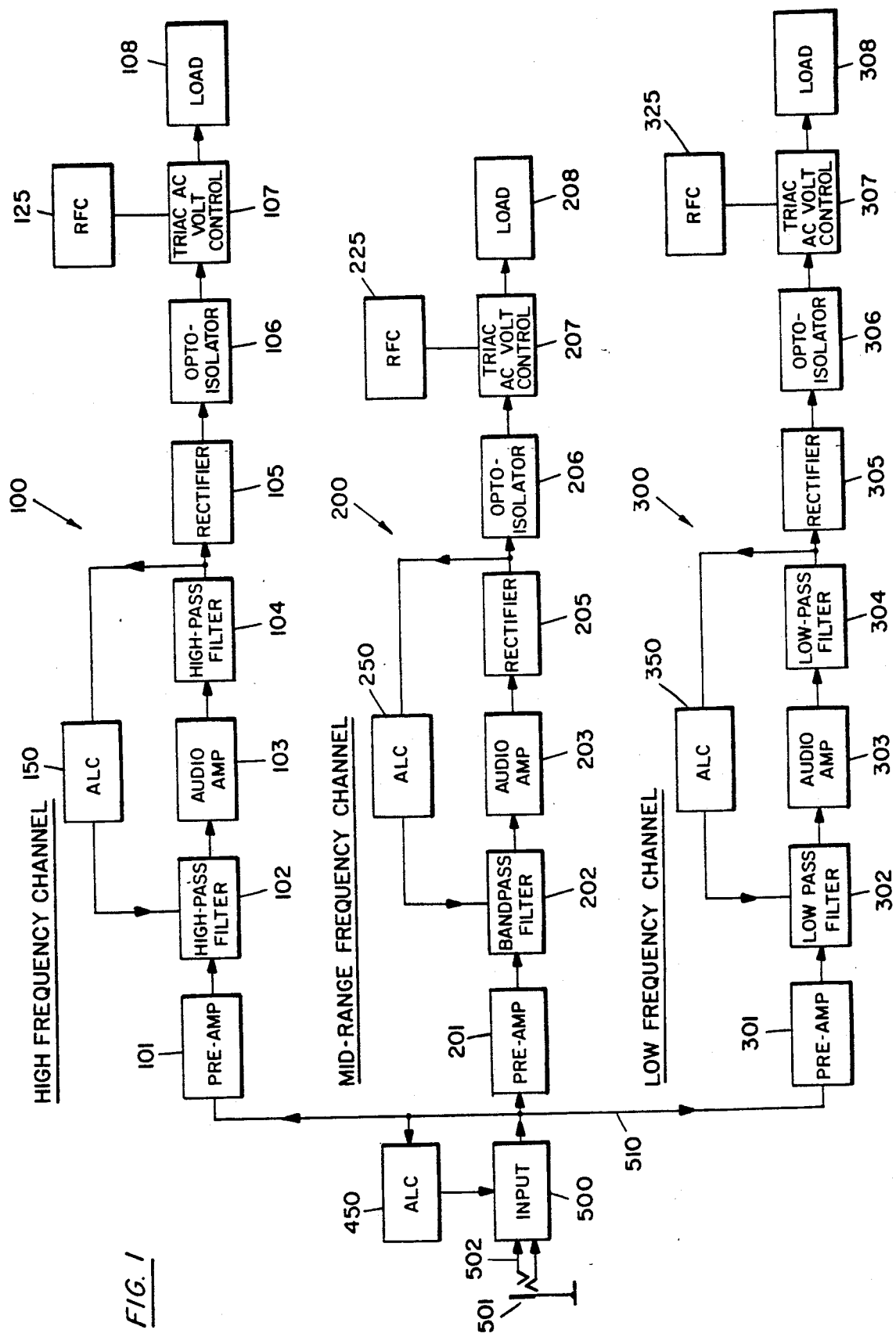
FIG. 1 is a block diagram of a preferred embodiment of the instant invention.

Referring now to FIG. 1, there is shown a block diagram of the switching apparatus of the invention. In this embodiment, a suitable input circuit 500 is connected by means of an appropriate receptacle 502 to receive an input jack 501. The jack 501 can be connected to any suitable input source, typically an acoustic signal source. The output of input circuit 501 is connected to a common line 510 which is connected to the input of automatic level controller (ALC) 450. The output of ALC 450 is returned to the input circuit 500 in order to control the level of the output signal produced by the input circuit 500.

The common line 510 is also connected to each of the different frequency channels in the instant invention. The high frequency channel 100, the mid-range frequency channel 200 and the low frequency channel 300 are separate but similarly constructed channels. The respective channels include a pre-amplifier 101, pre-amplifier 201 and pre-amplifier 301. Each of these pre-amplifiers has the input thereof connected to the common terminal 510.

The individual outputs of the pre-amplifiers are connected to respective high-pass filter 102, bandpass filter 202 and low pass filter 302. The outputs of the filters are applied to audio amplifiers 103, 203 and 303, respectively. The outputs of the amplifiers 103 and 303 are connected to the high pass filter 104 and the low pass filter 304, respectively. The outputs of high-pass filter 104, low-pass filter 304 and audio amplifier 303 are connected to the inputs of automatic level controllers 150, 250 and 350, respectively. The outputs of the ALC 150, 250 and 350 are connected, in a feedback loop, to the input filter circuits, namely the high-pass filter 102, the band pass filter 202 and the low-pass filter 302, respectively. In addition, the outputs of high pass filter 104, audio amplifier 203 and low pass filter 304 are connected to the inputs of rectifiers 105, 205 and 305, respectively. The outputs of the respective rectifiers are connected to the inputs of the opto-isolators 106, 206 and 306, respectively. The outputs of the opto-isolators are then connected to the trigger or control terminals of triac voltage control circuits 107, 207 and 307, respectively. The RF chokes (RFC) 125, 225 and 325 are connected to the triac circuits 107, 207 and 307, respectively. The outputs or loads 108, 208 and 308 are connected to the outputs of triac voltage control circuits 107, 207 and 307, respectively.

In a brief description of the operation, an input signal is applied to the input circuit 500 by the appropriate jack connections 501/502. The ALC 450 operates to maintain the output signal produced by the input circuit 500 at a prescribed level so that signal is neither too high nor too low. The pre-amplifiers 101, 201 and 301 in the respective channels amplify the signals to a desired range. The high-pass, low-pass and band pass filters 102, 202 and 302 function in a normal fashion to filter (or pass) prescribed frequency ranges of signals. In this particular instance, the filters are arranged to have no overlap therein between so that only one channel is operative to receive and operate on signals based upon the frequency of the input signal. The audio amplifiers 103, 203 and 303 independently operate to amplify the audio signals supplied thereto. The high pass filter and low pass filters 104 and 304, respectively, further define the frequency of the signals which are transmitted through the channels 100 and 300.

A second band pass filter is not used with channel 200 in this embodiment. However, in some embodiments it may be desirable to include such an additional filter.

The rectifier circuits operate on the signals produced in the respective channels and produce pulses of a specified polarity. These pulsed are supplied to the respective opto-isolators 106, 206 and 306 which transmit signals to the remainder of the circuit through an optical transducer connection. The respective triac circuits are energized in a typical fashion as a function of the signals supplied thereto. The RF choke (RFC) operates to selectively switch the load energy. The signal from the choke/triac circuit is applied to the load 108, 208 and/or 308, respectively. In the instance where the load represents a light bulb or the like, the light bulb is, effectively, and selectively, energized to produce a glow or beam upon receipt of signals representative of only a particular freqeuncy range.

Figure 2:
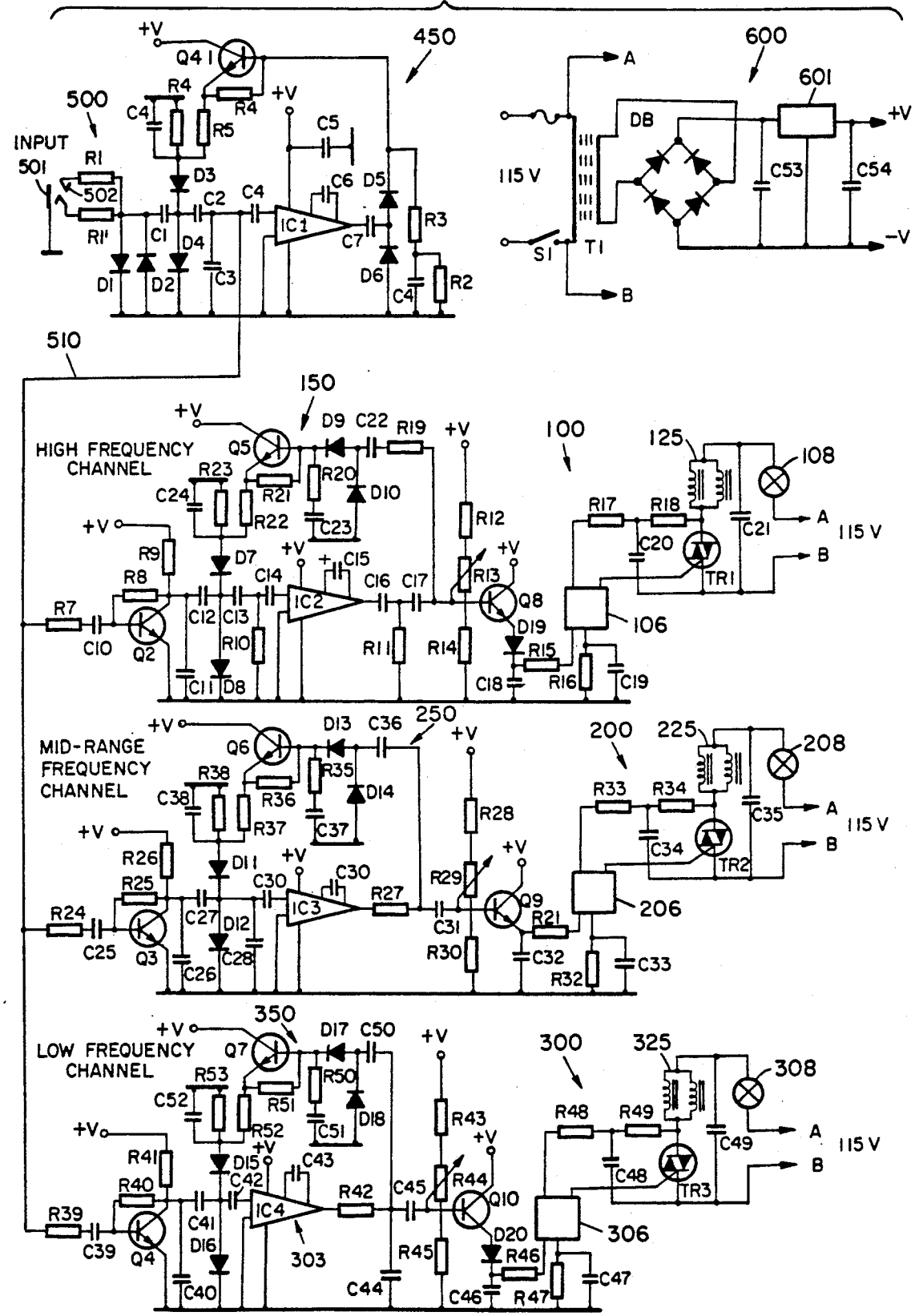
FIG. 2 is a detailed schematic diagram of the instant invention.

Referring now to FIG. 2, there is shown a detailed version of the instant invention. In FIG. 2, a typical power supply or power source 600 is provided. That is, the power line which, in this case, provides 115 volts AC is connected by switch 1 and the fuse to the input terminals A and B at the primary winding of tranformer T1. As will be seen, the terminals A and B at the input of transformer T1 are also connected to the loads 108, 208 and 308. The secondary winding of the transformer T1 is connected to a diode or rectifier bridge DB which provides a full wave, rectified signal to the smoothing circuit comprising capacitors C53, C54 and the resistor network 601. The output signals +V and −V (where V may be on the order of 12 volts) are thus detected across output capacitor C54. The fully rectified and filtered signals are supplied to the remainder of the circuit.

The input circuit 500 is shown to include resistors R1 and R1' which are connected to the jack 502 and input 501 as before. The ALC circuit comprises the clamping diodes D1 and D2 as well as the coupling network comprising capacitors C1, C2, C3 and C4 which are connected to an input of integrated circuit IC1. The other input terminal of the circuit IC1 is connected to ground. The output of the circuit IC1 is connected via capacitor C7 to the common junction between the anode of diode D5 and the cathode of diode D6 which diodes are connected in parallel with the network comprising resistors R2 and R3 with capacitor C8 in parallel with resistor R2. The output of circuit IC1 is connected to the base of transistor Q4 which is selectively turned on to provide additional current through resistor R5 and diode D3 to the input of circuit IC1. In the event that a reduction in output is required, the signals applied to base of transistor Q4' will render the transistor less conductive. Consequently, the ALC 450 is a self regulating circuit which produces a substantially constant level output signal at the junction of the capacitors C2 and C3 along the conductor 510.

The input signal on line 510 is supplied to the respective pre-amplifiers which comprise transistors Q2, Q3 and Q4 along with the appropriate control circuitry associated therewith.

The high frequency filter 102 includes capacitors C13, C14 and resistor R10. The high frequency filter is connected to apply signals to the audio amplifier 103 represented by integrated circuit IC2. The high frequency filter comprising capacitor C16, C17 and resistor R11 is connected to the output of the audio amplifier to enhance the high frequency filter operation. The automatic level controller 150 includes transistor Q5, diodes D9 and D10 along with resistor R19 and capacitor C22, as well as the shunt resistor R20 and capacitor C23. The resistors R21, R22 and R23 are counterparts to the components shown ALC 450 supra.

The transistor Q8 and the junction with the voltage divider network comprising resistors R12, R13 and R14 together with diode D19, capacitor C18 and resistor R15 provide a rectifier circuit which is connected to the opto-isolator 106. The resistor R16 and capacitor C19 are current limiting devices. The opto-isolator 106 is connected to the trigger electrode of triac TR1. One terminal of the triac is connected to the B terminal of transformer T1 along with one side of each of capacitors C20 and C21. The resistors R17 and R18 are connected between the opto-isolator and the other terminal of triac TR1. The RF choke 125 is connected from the second terminal of the triac TR1 together with the other side of capacitor C21 to one side of the load 108 which is then connected to terminal A of transformer T1. The signal is applied to the input circuit 500 and regulated by the ALC 450 and applied to the input terminal of pre-amplifier which includes the transistor Q2 in channel 100. The signal passes through the high-pass filter and is applied to the audio amplifier 103 which, in this case, includes integrated circuit IC2. The output high pass filter is then connected back to the input of the IC circuit via the ALC circuit which includes the transistor Q5.

In addition, the outputs of the audio amplifier and high pass filter are applied to the rectifier circuit where it is coverted to a high frequency signal which is supplied to the opto-isolator. The isolator is a typically optically active circuit device which transmits signals thereacross while being electrically isolating between the two circuit sections. The signal from the isolator selectively activates the triac TR1 which causes current flow through the choke and through the load 108 wherein the load is activated. When load 108 takes the form of a light bulb, a light flash is generated.

Channels 200 (mid-range frequency channel) and 300 (low frequency channel) are substantially similar to channel 100. Obviously, channel 300 has a low pass filter rather than a high pass filter. In addition, certain of the component values may be quite different. Nevertheless, the operation is substantially identical on a low frequency basis.

Channel 200 is quite similar to each of these channels except that a mid-range frequency of band pass filter at the input of the integrated circuit, audio amplifier IC3 is provided. The output of the audio amplifier is coupled directly to the rectifier circuit and to ALC circuit. Thus, the operation of these channels is substantially similar to the high frequency or high-pass channel except that the frequencies of operations are different.

Thus, there has been shown and described a preferred embodiment of the invention. Those skilled in the art may conceive modifications or variations on this circuit arrangement. However, any such modifications or variations which fall within the purview of this description are intended to be included therein, as well. The description of the invention is intended to be illustrative only and is not intended to limitative. Rather, the scope of the invention is limited only by the claims appended hereto.

I claim:

1. A control apparatus comprising, input signal receiving means, a plurality of signal processing channels connected to said input signal receiving means, each of said signal processing channels operative to process signals of different frequency bands, separate automatic channel level controller means included in each of said signal processing channels, and automatic input level controller means connected to said input signal receiving means and operative to automatically control the level of signals at said input signal receiving means.

2. The apparatus recited in claim 1 wherein, said plurality of signal processing channels comprises at least three separate channels.

3. The apparatus recited in claim 2 wherein, said separate channels include a high frequency filter means, a low frequency filter means, and a midrange frequency filter means, respectively.

4. The apparatus recited in claim 3 wherein, the frequency ranges of said separate channels do not overlap.

5. The appartus recited in claim 3 wherein, each of said separate channels includes amplifier means which is connected to the respective filter means.

6. The apparatus recited in claim 5 wherein, each of said separate channels includes an optic isolator device which is connected to an output of the respective one of said amplifier means.

7. The apparatus recited in claim 6 wherein, each of said channels includes a triac connected to an RF choke, each said triac connected to the respective optical device in the channel.

8. The apparatus recited in claim 1 including, plurality of load means respectively connected to the outputs of said plurality of signal processing channels.

9. The apparatus recited in claim 5 wherein, said amplifier means includes pre-amplifier means connected to the input of the respective filter means, and audio amplifier means which is connected to the output of the respective filter means.

10. The apparatus recited in claim 9 including, second high frequency filter means connected to the output of the respective audio amplifier means, and second low frequency filter means connected to the output of the respective audio amplifier means.

11. The apparatus recited in claim 8 wherein, each of said load means comprises a light source.

12. The apparatus recited in claim 1 wherein, each of said automatic level controller means includes at least one current control device.

13. The apparatus recited in claim 12 wherein, said current control device comprises a semiconductor device.

14. The apparatus recited in claim 1 wherein, each of said channels includes amplifier means and filter means connected to said amplifier means, each said automatic level controller means connected to supply signals to said amplifier means via said filter means.

15. The apparatus recited in claim 6 including, rectifier means connected between said amplifier means and said optical isolator device.

16. The apparatus recited in claim 15 wherein, said rectifier means includes a transistor means.

17. A control apparatus comprising, input signal receiving means, a plurality of signal processing channels connected to said input signal receiving means to receive signals therefrom, each of said signal processing channels includes filter means operative upon a different frequency, each of said signal processing channels includes amplifier means connected to the respective filter means, each of said signal processing channels operative to process signals of different frequency bands, a plurality of channel controller means operatively connected respectively to each of said signal processing channels for automatically controlling the level of the signal being processed in each of said channels, and input automatic level controller means connected to said input signal receiving means and operative to automatically control the level of the signals at said input signal receiving means.

* * * * *